US010416547B2

(12) United States Patent
Bhakta et al.

(10) Patent No.: US 10,416,547 B2
(45) Date of Patent: Sep. 17, 2019

(54) ASSYMETRIC SPOT AREA SPOKE REDUCTION

(71) Applicant: TEXAS INSTRUMENTS INCORPORATED, Dallas, TX (US)

(72) Inventors: Vikrant R. Bhakta, Dallas, TX (US); Steven Paul Krycho, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/821,701

(22) Filed: Nov. 22, 2017

(65) Prior Publication Data

US 2019/0155136 A1    May 23, 2019

(51) Int. Cl.
| | | |
|---|---|---|
| *G03B 21/20* | (2006.01) | |
| *F21V 11/08* | (2006.01) | |
| *F21V 14/08* | (2006.01) | |
| *F21V 9/30* | (2018.01) | |
| *G03B 21/00* | (2006.01) | |
| *F21V 9/04* | (2018.01) | |
| *F21V 9/06* | (2018.01) | |

(52) U.S. Cl.
CPC ............. *G03B 21/208* (2013.01); *F21V 9/30* (2018.02); *F21V 11/08* (2013.01); *F21V 14/08* (2013.01); *G03B 21/204* (2013.01); *G03B 21/2066* (2013.01); *F21V 9/04* (2013.01); *F21V 9/06* (2013.01); *G03B 21/008* (2013.01)

(58) Field of Classification Search
CPC ............... G03B 21/208; G03B 21/204; G03B 21/2066; G03B 21/008; F21V 9/30; F21V 9/16; F21V 11/08; F21V 14/08; F21V 9/04; F21V 9/06
See application file for complete search history.

(56) References Cited

U.S. PATENT DOCUMENTS

| | | | | |
|---|---|---|---|---|
| 2003/0147052 A1* | 8/2003 | Penn | .................. | G02B 26/0841 |
| | | | | 353/31 |
| 2005/0041313 A1* | 2/2005 | Stam | .................. | G02B 27/1013 |
| | | | | 359/877 |
| 2010/0118540 A1* | 5/2010 | Destain | ................ | G02B 27/102 |
| | | | | 362/293 |
| 2014/0253882 A1* | 9/2014 | King | .................... | G02B 26/008 |
| | | | | 353/31 |

* cited by examiner

*Primary Examiner* — Sultan Chowdhury
*Assistant Examiner* — Magda Cruz
(74) *Attorney, Agent, or Firm* — Michael A. Davis, Jr.; Charles A. Brill; Frank D. Cimino

(57) ABSTRACT

In described examples, one or more devices include: a light source to generate a beam of light; and optics to generate a spot of light in response to the beam of light. A color wheel revolves in a direction of rotation about an axis, so the spot of light illuminates an area of the color wheel. The spot of light has: a first width; and a second width wider than the first width and orthogonal to the first width. The first width is aligned tangential to the direction of rotation.

15 Claims, 6 Drawing Sheets

ASSYMETRIC SPOT AREA SPOKE REDUCTION

BACKGROUND

In some electronic image projectors, light for projection by an image projector is sourced by emission of light from a lamp or laser. Before being modulated and projected, the emitted light is usually reflected and focused upon a light tunnel (or light rod) of the projector. The emitted light can be of a nearly white correlated color temperature such that light having different wavelengths can be obtained therefrom for projecting the optical image in color. Often the primary colors red, blue and green are selected as the different wavelengths. The primary colors are obtained by shining the light from the lamp through a rotating color wheel. The color wheel is usually interposed between the source of the focused light and the entrance of the light tunnel. The color wheel is arranged to spin such that different colored light (a different primary color) is filtered through the color wheel at different times. However, a blended color is obtained when the unfiltered light from the light source shines upon two different colored portions of the color wheel at the same time (e.g., such that a color wheel spoke is generated). When the color obtained from the color wheel is a blended hue during a spoke time, it is different from the colors of either of the simultaneously illuminated two different colored portions. If the projector is shuttered during the spoke times (e.g., to not project a "blended" spoke color), it reduces the brightness or requires a complex and expensive electronics solution to rapidly pulse the light source.

SUMMARY

In described examples, one or more devices include: a light source to generate a beam of light; and optics to generate a spot of light in response to the beam of light. A color wheel revolves in a direction of rotation about an axis, so the spot of light illuminates an area of the color wheel. The spot of light has: a first width; and a second width wider than the first width. The first width is aligned tangential to the direction of rotation.

DETAILED DESCRIPTION

In this description: (a) the term "portion" can mean an entire portion or a portion that is less than the entire portion; (b) the term "package" can mean a substrate or a sealed container, which can include die, wafers or micromechanical devices in a local environment that is sealed from an outside environment; (c) the term "cone" can mean a volume of space illuminated by projecting a shape in cross section, wherein the projected shape is not necessarily a perfect circle (e.g., not necessarily the base of a perfect cone); and (d) the term "optics" can mean any component or set of components for at least one of generating, propagating, reflecting, refracting, masking, filtering, modulating and projecting light.

In some projectors, light from a light source is reflected and focused as an illuminated area (spot). The spot appears as a perfect circle (e.g., having a constant radius) when viewed along the axis of travel of the focused light. The focus point for the illuminated spot is focused upon the entrance of the tunnel. In contrast, described examples focus the light from the lamp as an asymmetric spot. As described herein, light from a light source (such as a lamp or laser diodes and/or phosphors) is focused as an asymmetric spot through or upon a color wheel, such that the asymmetric spot reduces the spoke size/duration of the color wheel.

Figure 1:
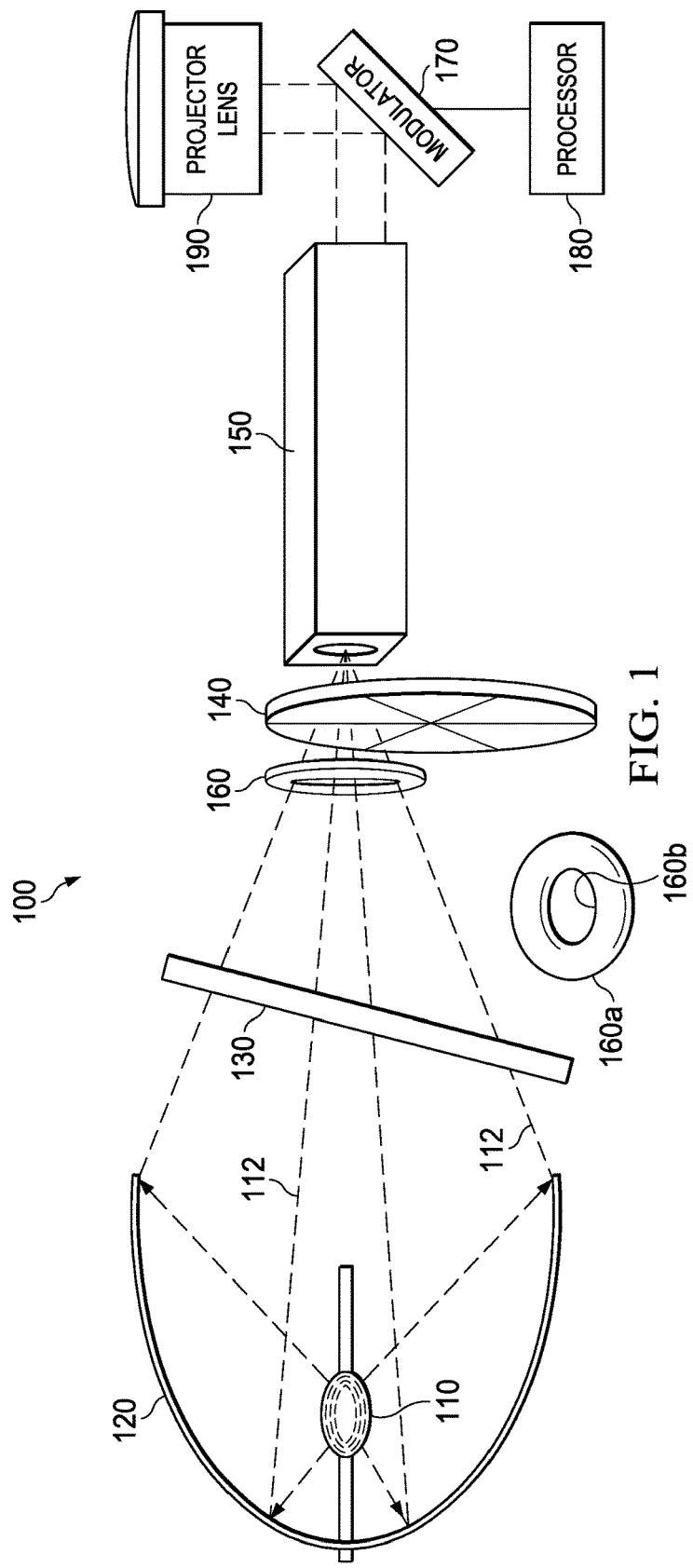
FIG. 1 is an orthographic view of an image projection system for asymmetric aperture-induced decreased color wheel spoke size.

FIG. 1 is an orthographic view of an image projection system for asymmetric aperture-induced decreased color wheel spoke size. The image projection system 100 generally includes a light source 110, a reflector 120, a filter 130, a color wheel 140, a light tunnel 150, an optional asymmetric aperture 160, a modulator 170, a processor 180 and a projection lens 190.

The light source 110 can be an incandescent lamp (e.g., light bulb) or one or more diodes (including laser diodes). The light source 110 is arranged to produce light for directional focusing by reflector 120 along a first axis. The reflector 120 includes a reflective surface for reflecting the light 112 as a beam (e.g., cone) of light towards the filter 130 and the color wheel 140. The reflector 120 is arranged to focus light upon the entrance of the light tunnel 150. The focused light 112 is usually filtered by filter 130 to remove light of ultraviolet (UV) and/or infrared wavelengths for safety and to avoid degrading pigments in the color wheel 140.

An optional asymmetric aperture 160 is arranged for reshaping the beam of light to form a reshaped beam of the focused light 112 (e.g., after filtering by filter 130). Outer portions of the cone of the focused light 112 are occluded (e.g., masked), such that the shape of the asymmetric inner margin of the aperture 160 controls the shape of the asymmetric spot illuminating the entrance to the light tunnel 150. The aperture 160 controls the shape of the asymmetric spot by masking (e.g., occluding) selected portions of the cone of focused light 112.

In some embodiments, the inner margin of the aperture 160 is a non-perfectly-circular shape (e.g., an arbitrary shape other than a perfect circle) for forming an asymmetrically illuminated spot on the surface of the color wheel. In some examples, the inner margin of the aperture 160 includes a reflective (e.g., mirrored) surface for reflecting light rays, so light is not absorbed by the aperture 160 (which would otherwise decrease optical efficiency and increase heat generation).

The asymmetric shape of the inner margin of the aperture 160 blocks portions of the focused light 112 radially outwards from the first axis, thereby creating a shaped spot of a shape similar to the inner margin of the aperture 160. Accordingly, the cone of the focused light 112 is asymmetrically narrowed along a first direction (e.g., where the first direction is orthogonal to the axis of the direction of travel of the focused light 112). For example, a top view of the asymmetric aperture-induced shaped spot is shown hereinbelow with respect to FIG. 3.

The asymmetrically narrowed cone of focused light 112 is projected through the color wheel 140 such that, for example, an illuminated area having an asymmetric perimeter (asymmetric spot) is visible on the surface of the color wheel 140. For example, the asymmetric spot is generally oblong, and not perfectly circular.

In some embodiments, the aperture 160 is an irregular annulus or torus 160a. The torus 160a includes an elliptically shaped void within the area outlined by the elliptical margin 160b, which is non-circular. The aperture 160 is arranged to receive a conical beam of the reflected light 112 and to selectively pass an asymmetrically shaped beam (e.g., a shaped cone of light). The cone of light includes (e.g., in cross-section) an oblong-shaped area of illumination. The shaped cone of light is projected through the color wheel 140 so, for example, a time-multiplexed color-variant spot is focused upon the surface of the entrance of the light tunnel 150.

The aperture 160 includes a face generally parallel to a face of the color wheel 140, where the aperture 160 includes an opening extending through the aperture 160 face. In some embodiments, the opening is an ellipse having: a first axis; and a second axis longer than the first axis. The second axis of the ellipse is aligned with (parallel to) a color wheel radius that extends from a center of rotation of the color wheel 140 through the illuminated spot. The torus 160a can include an optional reflective surface, such that blocked portions of the focused light 112 are recycled as reflected light (e.g., which helps restore some of the intensity of the focused light 112 otherwise lost or absorbed due to the interposition of the elliptical margin 160b). The recycling of the otherwise blocked light increases projected beam intensity, reduces heat dissipation, and increases efficiency.

The color wheel 140 includes translucent regions or sectors (e.g., pie-piece-shaped regions) of different colors (e.g., red, green and blue). The color wheel 140 is arranged to rotate about an axis of rotation (e.g., about the center of mass of the color wheel 140), such that the different color regions of the wheel successively pass through the area illuminated by the asymmetric spot. Accordingly, the color wheel 140 generates a time-modulated color-variant beam of colored light by optically filtering the irregularly shaped beam of light passed through the asymmetric aperture 160.

The time-modulated color-variant beam of colored light is directed through a light tunnel 150 for collimating. The collimated time-modulated color-variant beam is projected onto the light modulator 170. The light modulator 170 modulates the incident light (e.g., the collimated time-modulated color-variant beam) in response to an electronic image and directs the modulated light towards the projection lens 190 to project the visual image for display. The processor 180 outputs an image signal (e.g., video stream of electronic images) to the light modulator 170, such that the timing of the light modulation of the light modulator 170 is controlled with respect to: frame rates; spin rate(s) of the color wheel; and spoke timings. The light modulation can shutter (e.g., turn off) the light (e.g., of the collimated time-modulated color-variant beam), which would otherwise have been projected during times in which the asymmetric spot simultaneously illuminates two different color regions of the color wheel 140.

The light modulator 170 selectively reflects individual portions (e.g., pixels), such that correctly hued colors are perceived by a human viewer of an image projected and displayed on a suitable surface. For example, the light modulator 170 can be a spatial light modulator (SLM), such as a liquid crystal display or a deformable micromirror device (DMD), which can also be referred to as a digital micromirror device. Accordingly, in an embodiment, light modulator 170 is a DMD enclosed in a package that includes an optically transparent window for transmitting incident and reflected light. The DMD includes a two-dimensional array of reflective elements (e.g., micromirrors) arranged in rows and columns, where each such reflective element generates a respective pixel to be displayed in the image. The reflective elements selectively reflect the incident light (e.g., the collimated time-modulated color-variant beam) through the projection lens 190. In response to signals from the processor 180 and to the collimated time-modulated color-variant beam, the reflective elements beam a selected image though the projection lens 190 for display upon any suitable surface.

Figure 2:
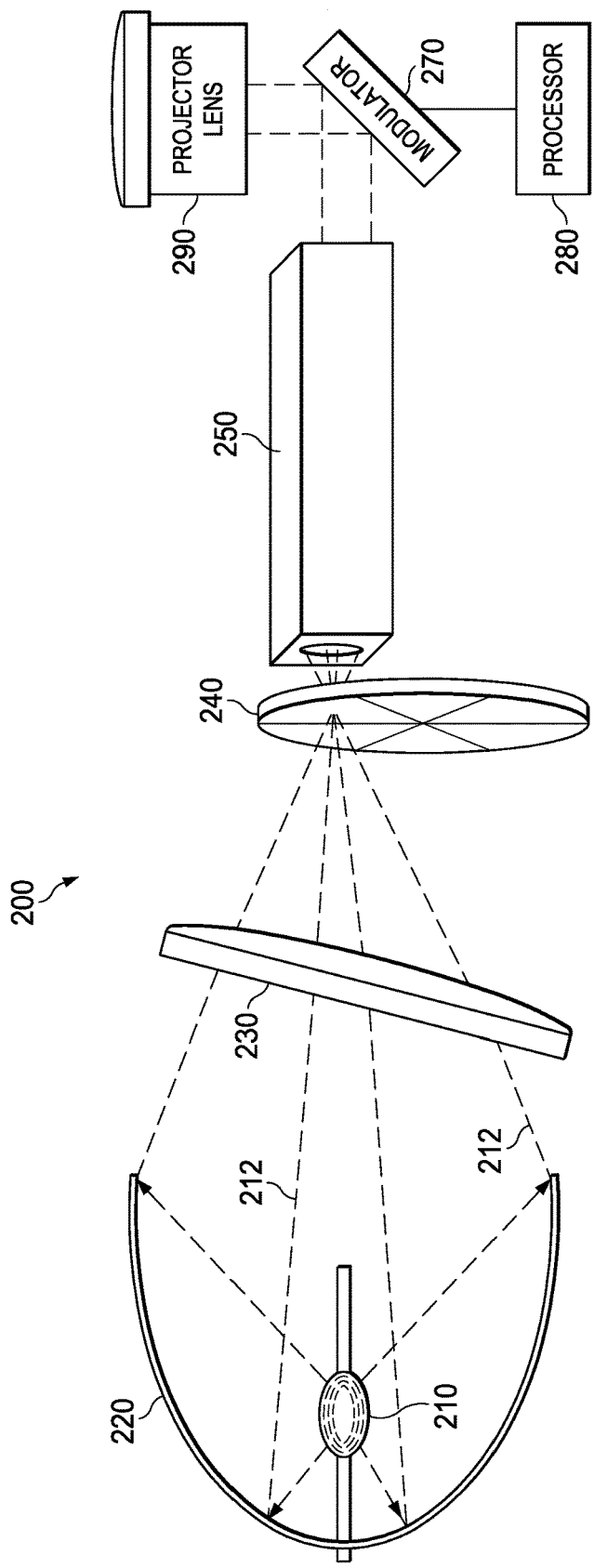
FIG. 2 is an orthographic view of an image projection system for astigmatically induced decreased color wheel spoke size.

FIG. 2 is an orthographic view of an image projection system for astigmatically induced decreased color wheel spoke size. The image projection system 200 generally includes a light source 210, a reflector 220, an astigmatic filter 230, a color wheel 240, a light tunnel 250, a modulator 270, a processor 280 and a projection lens 290.

The light source 210 can be an incandescent lamp (e.g., light bulb) or one or more diodes (including laser diodes). The light source 210 is arranged to produce light for directional focusing by the reflector 220. The reflector 220 includes a reflective surface for reflecting the light 212 as a cone or column of light towards the astigmatic filter 230 and the color wheel 240.

The focused light 212 is filtered by the astigmatic filter 230 to remove ultraviolet (UV) and/or infrared wavelengths for safety and to avoid degrading pigments in the color wheel 240. The astigmatic filter 230 includes one or more lensing surfaces for astigmatically generating an asymmetric spot for illuminating the color wheel 240. The lensing of the astigmatic filter 230 directs the focused light 212 upon the surface of the color wheel 240. For example, a lensing surface (or combination of lensing surfaces) of the astigmatic filter 230 can be cylindrical, ellipsoidal (e.g., but not spherical) or a combination thereof. Also, for example, the astigmatic filter 230 can include a first focal length (e.g., along a first axis) longer than a second focal length (e.g., along a second axis orthogonal to the first axis). The different focal lengths irregularly refract incident light to transmit (e.g., pass) a non-circular spot (e.g., asymmetric and/or elliptical spot) of illumination for imaging (e.g., focusing) upon the surface of the color wheel 240.

The astigmatic filter 230 refracts the incident conical beam (e.g., perfectly conical beam) of light 212 to form a reshaped beam of focused light. The astigmatic refraction illuminates the surface of the color wheel 240 to form an asymmetric spot (e.g., 410 of FIG. 4). The asymmetric spot can be generally oblong, so it has a first width and a second width, where the first width is shorter than the second width and is aligned tangential to (parallel to a line that is tangential to) an edge point of the color wheel, and where the second width is longer than the first width and is orthogonal to the first width. The color wheel 240 rotates (e.g., spins), so a surface of the entrance of the light tunnel 250 is spot-illuminated by a time-multiplexed color-variant cone of light (e.g., asymmetric cone of light).

In various embodiments, the astigmatic filter 230 can be a neutral density filter (such that all frequencies of light are generally attenuated equally) or a UV filter for passing visible frequencies of light and filtering (e.g., attenuating)

UV frequencies of light. In some examples, the lensing and filtering functions of the astigmatic filter can be distributed among several components, such that the functions of lensing and filtering are performed by separate components of the image projection system 200.

The astigmatic lens (e.g., anamorphic, cylindrical, ellipsoidal or non-spherical lens) generates an asymmetric spot without masking portions of the light, thereby avoiding absorption (of light) that would have otherwise occurred as a consequence of interposing the aperture 160 as a shaping mask. Accordingly, the projected beam intensity is preserved, while avoiding heat dissipation caused by aperture masking, and while improving efficiency.

The rotating color wheel 240 generates a time-modulated color-variant beam of colored light, in response to the irregularly shaped beam of light that passes through the astigmatic filter 230. The time-modulated color-variant beam of colored light is directed upon and through a light tunnel 250 for collimating. The asymmetric spot generates a smaller spoke size (e.g., in contrast to a perfect circle illuminated spot). The projection optics are arranged for conserving etendue, which helps to reduce a loss in brightness when generating a smaller spoke size on the color wheel 240 face.

The collimated time-modulated color-variant beam is modulated into a visual image by the light modulator 270 and is directed towards the projection lens 290 to project the visual image for display. The processor 280 outputs an image signal (e.g., video stream) to the light modulator 270, so the light modulation's timing is controlled with respect to: frame rates, a spin rate of the color wheel, and spoke timings (e.g., from the starting of a spoke time to the ending of a spoke time).

Figure 3:
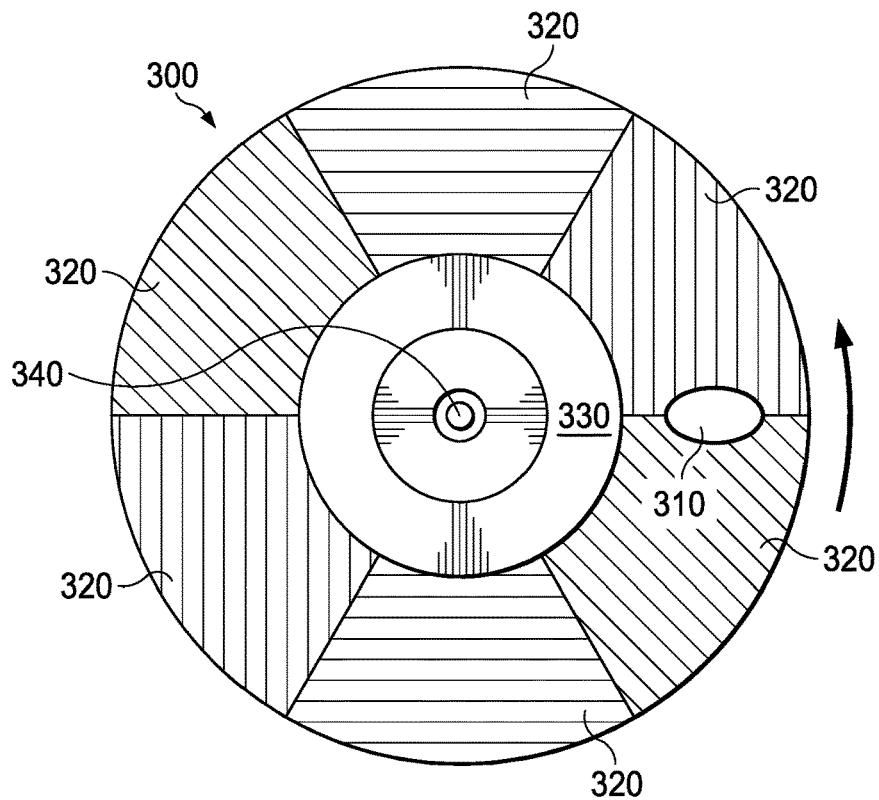
FIG. 3 is a top view of an asymmetric aperture-generated asymmetric spot illuminated upon a face of a color wheel.

FIG. 3 is a top view of an asymmetric aperture-generated asymmetric spot illuminated upon a face of a color wheel 300, which is an example of the color wheel 140 of FIG. 1 and is arranged to revolve in a direction of rotation. For example, the color wheel 300 include an asymmetric spot 310 for illuminating portions of one or two adjacent translucent color regions (e.g., sectors) 320 where the color regions are radially arranged around a center hub 330. The asymmetric spot 310 is a spot of light generated by the asymmetric aperture 160 and has: a first width; and a second width that is wider than the first width. The first width is aligned tangential to (parallel to a line that is tangential to) the direction of rotation. For example, the direction of rotation includes a ray extending tangentially from a ray origin on the edge of the color wheel in the direction of rotation, where the ray origin is adjacent to the asymmetric spot 310.

In one example, the six color regions 320 are for successively transmitting a selected one of red, green and blue colored light, according to the respective color region 320 illuminated by the asymmetric spot 310 (e.g., asymmetrically illuminated area or spot of light). In the example, two color regions 320 exist for each color such that each of the three colors is transmitted twice per revolution of the color wheel 300. Moreover, a color associated with each color region is different from a color of an adjacent color region. In another example, the color regions 320 can selectively transmit, for example, cyan, yellow and magenta colored light.

In various embodiments, any appropriate combination, arrangement, number, or color of color regions 320 may be used. As discussed hereinbelow with respect to FIG. 5 a phosphor 550 can be arranged within a "color region" of a phosphor wheel and illuminated with light from a laser such that the optically active phosphor contributes light of a color including a different wavelength than the wavelength(s) of the incident laser light.

In operation, the color wheel 300 rotates about hub 330, such that the asymmetric spot 310 illuminates successive portions of each of the color filter elements 320 in a rotational order, according to a direction of rotation of the color wheel 300. A spoke time exists when two adjacent translucent color regions 320 are illuminated at the same time. Accordingly, the light passing through the color wheel is output as a time-multiplexed color-variant (e.g., conical) beam of light. The color wheel is usually driven at a constant rotational velocity (e.g., by a shaft 340 coupled to the hub 330) such that the multiplexed color-variant beam of light is associated in a temporal relationship to each of the respective color regions 320.

The time-multiplexed color-variant beam of light is collimated by the light tunnel 150 and is directed toward an optically active surface of the package including the light modulator 170 such that a successive color is focused on the light modulator 170 at periodic or "main" intervals. According to the periodicity of the collimated time-multiplexed color-variant light beam, the processor 280 outputs signals for causing the light modulator 170 to shutter during spoke intervals and to generate a single-colored partial image in response to the incident color of the collimated time-multiplexed color-variant light beam. For example, the persistence of vision of the human eye integrates each projected color of the projected partial single-colored images as a "true-color" image.

The spoke interval is also temporally related to the dwell of each respective color region 320 and the rotational velocity of the color wheel 300. Accordingly, spoke intervals occur at times when the asymmetric spot 310 illuminates time-variant portions of two adjacent color regions 320 and at in-between times during which only a single color region 320 is illuminated. During each spoke interval, the color of the time-multiplexed color-variant light beam is a blended color, sharing hues from both of the illuminated color regions 320. In an example, the time-multiplexed color-variant light beam is shuttered (e.g., deflected away from the projection lens 290) by the light modulator 170 in response to a signal (e.g., generated by the processor 180) that indicates existence of the spoke interval.

The duration of the spoke interval is proportional to the narrow width (e.g., first dimension) of the asymmetric spot 310 and the speed of rotation of the color wheel. In a constant rate of rotation, decreasing the height of the asymmetric spot also decreases the spoke time, thereby increasing the quality of the displayed image illuminated by the light of the asymmetric spot 310 traversing the color wheel 300.

The asymmetric spot 310 includes a first dimension shorter than a second dimension, such that the angle subtended by the asymmetric spot 310 (the origin of the angle being the center of rotation) is less than the angle subtended by a perfectly circular area of illumination. Accordingly, shutter time can be reduced, and enhanced colors can be projected (e.g., as discussed hereinbelow with reference to FIG. 7).

In an example, the asymmetric spot 310 is elliptical (e.g., not perfectly circular), in which the long axis points generally towards the center of rotation of the color wheel 300. Accordingly, the asymmetric spot is characterized by a shorter dimension parallel to a secant line (or chord) defined by the intersection of the rays of an angle and the circular edge of the color, wherein the origin of the angle is the center of color wheel rotation and the angle subtends the asymmetric spot. As discussed hereinabove with respect to asymmetric aperture 160, the shape of the asymmetric spot 310 is generated in response to the cross-sectional shape of the interior void of the asymmetric aperture 160.

Figure 4:
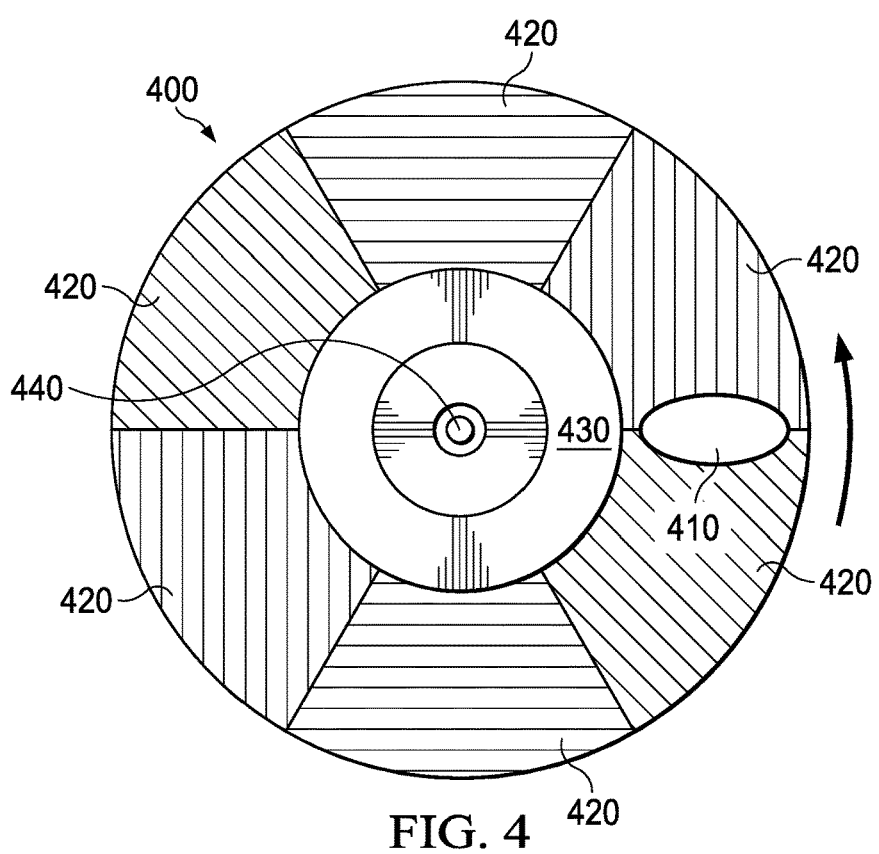
FIG. 4 is a top view of an astigmatically generated asymmetric spot upon the face of a color wheel.

FIG. 4 is a top view of an astigmatically generated asymmetric spot upon a face of a color wheel 400, which is one embodiment of the color wheel 140 of FIG. 1. For example, the color wheel 400 includes an asymmetric spot 410 for illuminating portions of one or two adjacent translucent color regions 420, where the color regions are radially arranged around a center hub 430. The asymmetric spot 410 is achieved using an anamorphic/cylindrical optical element (such as the astigmatic filter 230) positioned between the lamp and color wheel 400.

The asymmetric spot 410 is a spot of light generated by optics (e.g., the astigmatic filter 230) and has: a first width; and a second width that is wider than the first width. The first width is aligned tangential to (parallel to a line that is tangential to) the direction of rotation. The second width is orthogonal to the first width and aligns with a color wheel radius that extends from a center of rotation of the color wheel 400 through the asymmetric spot 410.

In operation, the color wheel 400 rotates about hub 430, such that the asymmetric spot 410 successively illuminates portions of each of the color filter elements 420 in a rotational order. Accordingly, the light passing through the color wheel is output as a time-multiplexed color-variant (e.g., conical) beam of light. The color wheel is driven at a constant rotational velocity (e.g., by a shaft 440 coupled to the hub 430), such that the multiplexed color-variant beam of light is associated in a temporal relationship to each one of color regions 420.

Figure 5:
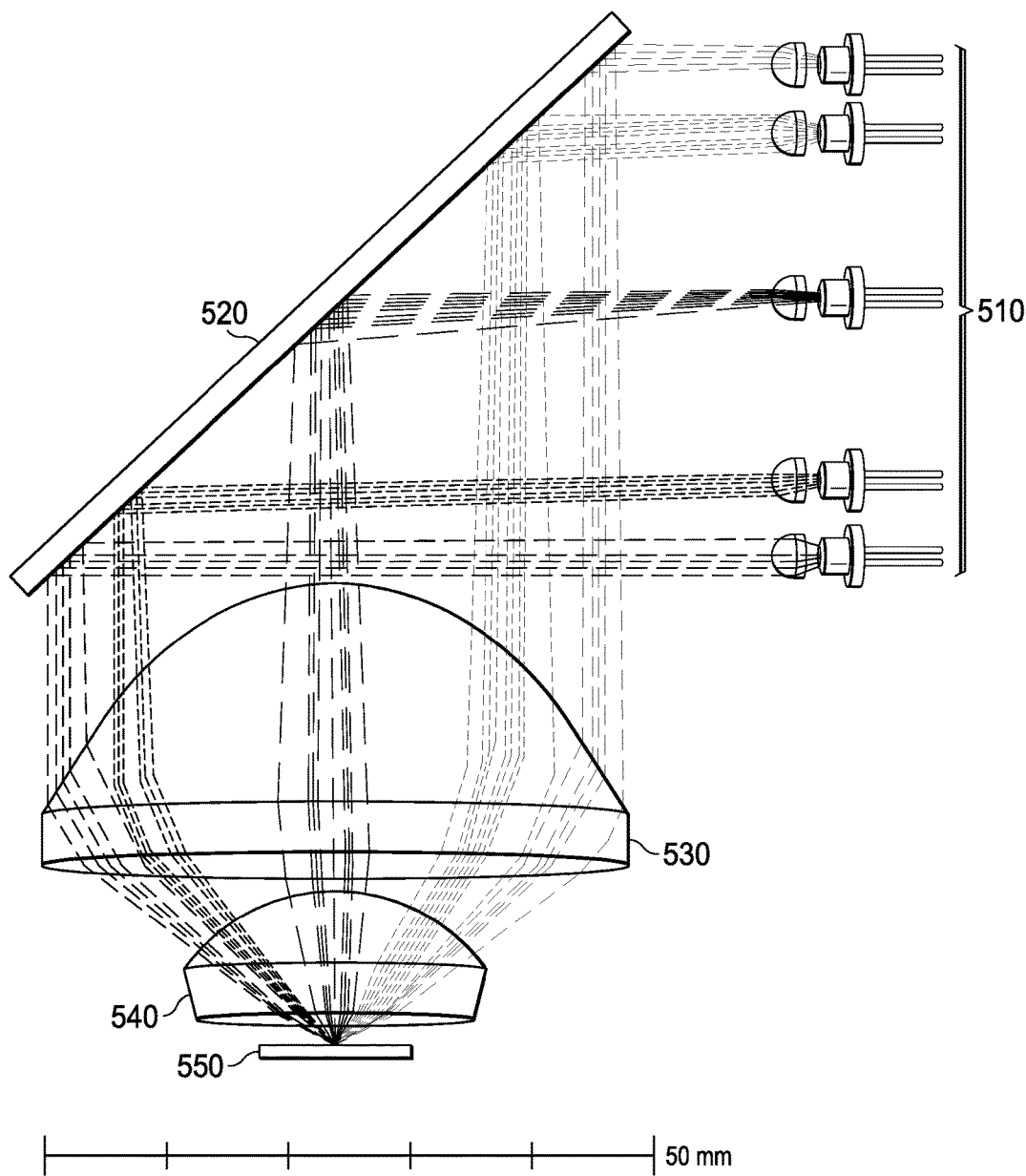
FIG. 5 is a side view of a laser excitation architecture of a phosphor for decreased spoke size illumination.

FIG. 5 is a side view of a laser excitation architecture of a phosphor for decreased spoke size illumination. For example, an array of laser diodes 510 can include multi-mode laser diodes for directing coherent light through lensing adapted for astigmatism to generate an elliptical pattern of laser illumination. For example, each of the multi-mode laser diodes is arranged to emit coherent light through a respective astigmatic lens (e.g., cylindrical, ellipsoidal, anamorphic and/or aspheric lens). The array of laser diodes 510 is arranged to emit beams of coherent light directed towards a dichroic mirror 520.

The dichroic mirror 520 is arranged to reflect the beams of coherent light towards a first lens 530 and a second lens 540. The first lens 530 and the second lens 540 are arranged to internally refract the coherent light reflected from the dichroic mirror 520 towards an area of the phosphor 550. The optics of the first lens 530 and/or the optics of the second lens 540 are optionally astigmatic (e.g., anamorphic), such that the phosphor 550 is illuminated in an elliptical pattern, discussed hereinbelow with reference to FIG. 6.

The phosphor 550 is arranged to phosphoresce (e.g., generate incoherent light) in response to the coherent light astigmatically refracted by the first lens 530 and the second lens 540. The phosphor 550 is deposited on the surface of a color wheel and is arranged to reflect the asymmetrically refracted coherent light and the phosphorescent light towards an optical modulator such as modulator 270 for projection (e.g., during times in which a spoke occurs in response to adjacent phosphors, each associated with a different color, being illuminated contemporaneously).

The phosphor 550 is arranged on the surface of the color wheel, which is arranged to rotate. The phosphor wheel includes separate regions for differing kinds of phosphors to emit different wavelengths of light, where the emitted light includes time-variant colors according to a degree of rotation of the color wheel. The rotation of the phosphor wheel causes spokes times to exist when the asymmetric pattern of illumination by one or more lasers illuminates portions of two adjacent phosphor regions. In an example, the light source includes an array of multi-mode laser diodes, and the multi-mode laser diodes are turned off during each spoke time.

Figure 6:
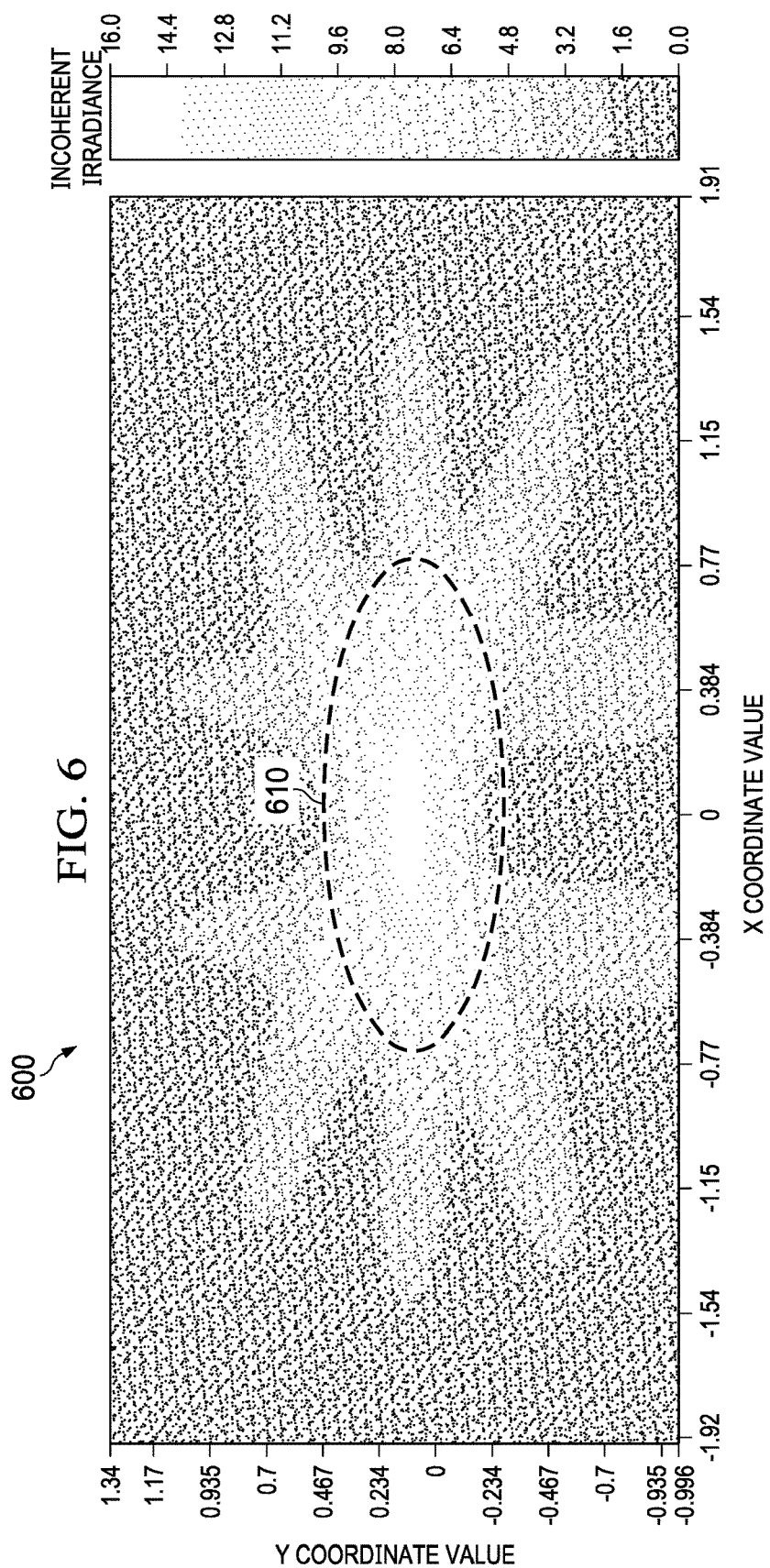
FIG. 6 is a plot of luminance of an astigmatic excitation of a phosphor for decreased spoke size illumination.

FIG. 6 is a plot of luminance of an astigmatic excitation of a phosphor for decreased spoke size illumination. For example, lasers generate a beam of coherent light for passing through anamorphic optics to shape the outlines of the beam of coherent light. A phosphor plot 600 shows results of the shaped cross section of the beam of coherent light exciting a phosphor surface.

The phosphor plot 600 indicates the relative luminance generated over the phosphor plane in response to an astigmatic excitation of the associated phosphors (e.g., phosphor 550). Generally, the astigmatic excitation of a phosphor generates a laser-illuminated spot on the phosphor for causing the phosphor to phosphoresce in an elliptical pattern 610 whose shorter dimension is aligned tangential to the direction of rotation of the phosphor wheel.

Figure 7:
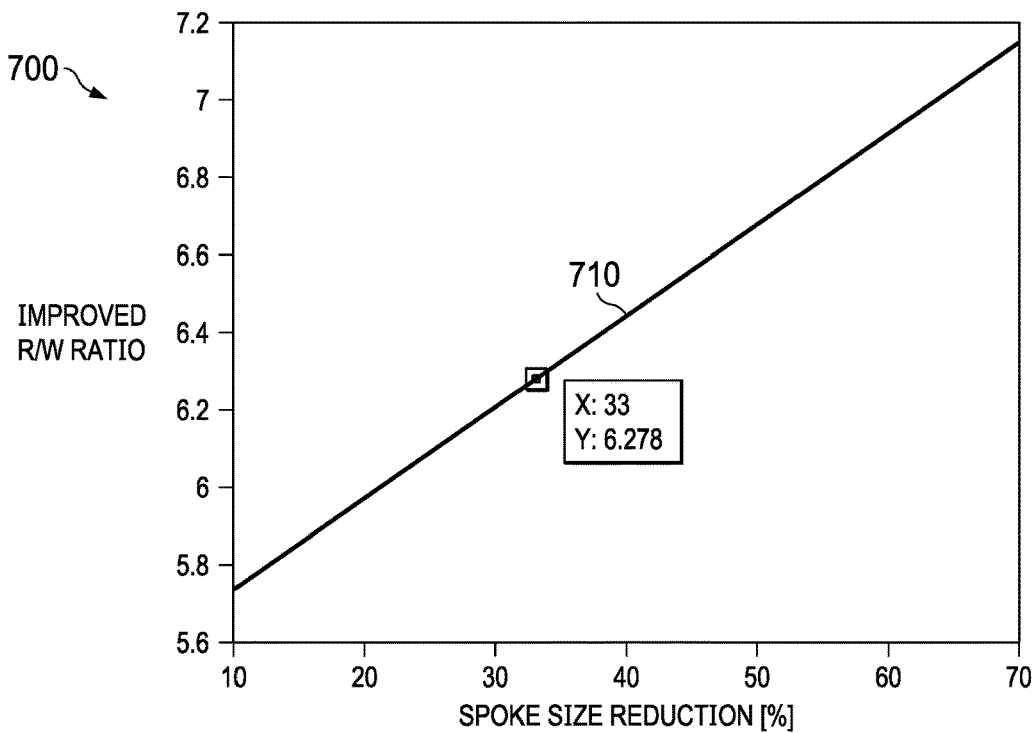
FIG. 7 is a graph of an improved red-to-white ratio as a function of spoke size reduction.

FIG. 7 is a graph of an improved red-to-white ratio as a function of spoke size reduction. For example, graph 700 includes function 710, which shows the relationship between the improved red-to-white ratio and the reduction of spoke size. The improved red-to-white ratio is determined (e.g., in part) by determining the spoke size reduction factor:

$$ds=1-SP_1/SP_0 \qquad (1)$$

where $Sp_1$ is the new spoke size, and $Sp_0$ is the original spoke size. For example, if the new spoke size $Sp_1$ is 12 degrees, and the original spoke size $Sp_0$ is 18 degrees, then the spoke size reduction factor ds indicates a spoke size reduction of one-third (e.g., 33 percent) of the original spoke size $Sp_0$.

The red-to-white improvement RWI resulting from decreasing the spoke size over a red segment of a color wheel is:

$$RWI=ds*Sp_0/(S_{RED}-Sp_0) \qquad (2)$$

where $S_{RED}$ is a red segment sector size in degrees, $Sp_0$ is the original spoke size in degrees, and ds is the spoke size reduction factor. If a red segment size $S_{RED}$ is 60 degrees, then the RWI is approximately equal to 0.14.

The new red-to-white ratio $RW_{new}$ is:

$$RW_{new}=(1+RWI)*RW_{old} \qquad (3)$$

If an original color-to-red ratio $RW_{old}$ is 5.5 percent, and a red segment size $S_{RED}$ is 60 degrees, then the new red-to-white ratio $RW_{new}$ is approximately 6.27 percent (e.g., as shown by function 710 for an input value of 33 percent). Accordingly, an approximately 30% reduction in the spot size along the direction of rotation can be achieved with minimal loss in brightness, such as by conserving the etendue of the light source for generating the asymmetric spot.

The specific color red of the red-to-white ratio $RW_{new}$ can be replaced by other colors to generate improved color-to-white ratios as a result of decreased spoke times. For example, the asymmetric spot of light includes a first average brightness over a first entire illuminated portion of the color regions to generate a first displayed image including a first color-to-white ratio. The first color-to-white ratio is improved over a second color-to-white ratio of a reference image that is generated by a notional circular spot of light (e.g., where the reference image would be generated from the same light source, optics, color wheel, light modulator and projection lens, and where the example circular spot of light has a constant radius, a second average brightness equal to the first average brightness and/or a second entire illuminated portion of the notional circular spot of light equal to a first entire illuminated portion of the asymmetric spot of light).

Because the diameter of the notional (e.g., original) circular spot of light is larger than the shorter (e.g., minor) axis of the asymmetric spot of light, the original spoke size (e.g., $Sp_0$) is larger than the new spoke size (e.g., $Sp_1$) of the respective spots of light. Accordingly, the new spoke time (e.g., from $Sp_1$) is shorter than a second spoke time (e.g., from $Sp_1$) when the notional circular spot of light simultaneously illuminates portions of two adjacent color regions of the color wheel.

Figure 8:
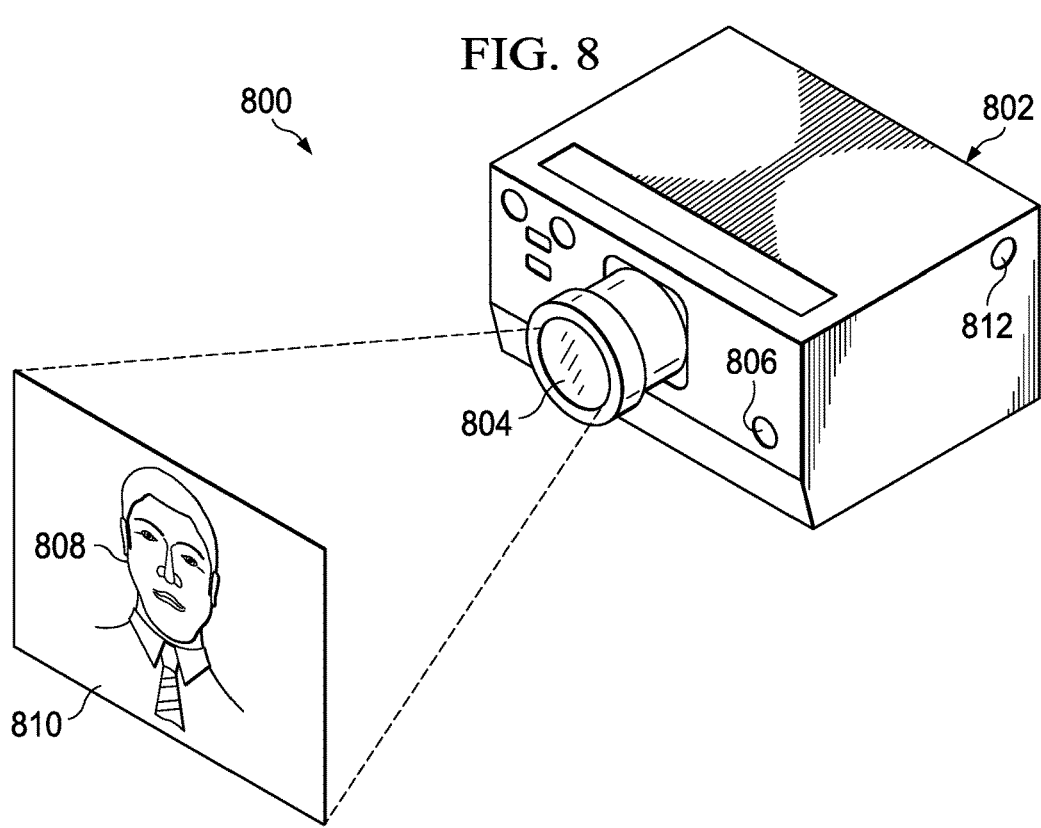
FIG. 8 is a perspective view of a projector for projecting light-modulated images.

FIG. 8 is a perspective view of a projector for projecting light-modulated images. For example, the optical projection system 800 includes a projector 802 for projecting an image onto a display surface (e.g., screen 810) through a projection lens 804 to generate a displayed image 808. The displayed image 808 can be a slideshow presentation or video projected by light modulated in color by a reduced spoke color/phosphor wheel as described herein. The system 800 can include a camera or image capture device 806, such as a charge-coupled device (CCD) camera or a complementary metal oxide semiconductor (CMOS) image sensor. In at least one embodiment, the image capture device 806 (e.g., for system color calibration) is embedded within projector 802. The system 800 includes one or more control buttons 812 to allow menu selections by a human user (e.g., selections for color or white balance adjustments).

Modifications are possible in the described embodiments, and other embodiments are possible, within the scope of the claims.

What is claimed is:

1. Apparatus, comprising:
a light source configured to generate a beam of light;
a color wheel having a surface, the color wheel configured to revolve in a direction of rotation about an axis; and
optics configured to generate a spot of light by astigmatically focusing the beam of light upon the surface of the color wheel, the spot of light having: a first width aligned tangential to the direction of rotation; and a second width wider than the first width and orthogonal to the first width.

2. The apparatus of claim 1, wherein the optics include an asymmetric aperture configured to generate the first width and the second width.

3. The apparatus of claim 2, wherein the asymmetric aperture has an inner margin that includes a mirrored surface for reflecting incident light.

4. The apparatus of claim 2, wherein the color wheel is configured to emit a beam of colored light by filtering the spot of light, and the apparatus further comprises a light tunnel having an entrance configured to receive the beam of colored light from the color wheel.

5. The apparatus of claim 1, wherein the optics are configured to conserve an etendue of the light source.

6. The apparatus of claim 1, wherein the optics include at least one of: an ultraviolet filter; or an infrared filter.

7. The apparatus of claim 1, wherein the color wheel includes phosphors configured to emit light in response to the spot of light, and the emitted light includes time-variant colors according to a degree of rotation of the color wheel.

8. The apparatus of claim 1, wherein the spot of light has an elliptical pattern.

9. Apparatus, comprising:
a light source configured to generate a beam of light;
a color wheel configured to revolve in a direction of rotation about an axis; and
optics configured to generate a spot of light by astigmatically lensing the beam of light, the color wheel including phosphors configured to emit light in response to the spot of light, the emitted light including time-variant colors according to a degree of rotation of the color wheel, and the spot of light having: a first width aligned tangential to the direction of rotation; and a second width wider than the first width and orthogonal to the first width.

10. Apparatus, comprising:
a light source including multi-mode laser diodes configured to generate respective beams of light;
a color wheel configured to revolve in a direction of rotation about an axis; and
optics, including an astigmatic lens, configured to generate a spot of light in response to the beams of light, the color wheel including phosphors configured to emit light in response to the spot of light, the emitted light including time-variant colors according to a degree of rotation of the color wheel, and the spot of light having: a first width aligned tangential to the direction of rotation; and a second width wider than the first width and orthogonal to the first width.

11. A system, comprising:
a light source configured to generate a beam of light;
a color wheel configured to revolve in a direction of rotation about an axis, the color wheel including at least first and second adjacent color regions configured to generate respective first and second colors, the first color being different from the second color;
optics configured to generate a spot of light in response to the beam of light, the color wheel being rotatable to a position for the spot of light to simultaneously illuminate portions of the first and second adjacent color regions, and the spot of light having: a first width aligned tangential to the direction of rotation; and a second width wider than the first width and orthogonal to the first width;
a light modulator configured to shutter light filtered or reflected by the color wheel during a spoke time; and
a projection lens configured to generate a displayed image by projecting and focusing the shuttered light.

12. The system of claim 11, wherein the spot of light has an average brightness, and the displayed image has a color-to-white ratio.

13. The system of claim 11, wherein the spoke time is when the color wheel is rotated to the position for the spot of light to simultaneously illuminate portions of the first and second adjacent color regions.

14. The system of claim 13, wherein the light source includes multi-mode laser diodes configured to turn off during the spoke time.

15. A method, comprising:
generating a beam of light;
reshaping the beam of light to form a reshaped beam, the reshaped beam being generated by at least one of: an asymmetric aperture; astigmatically refracting the beam of light; or astigmatically reflecting the beam of light; and
in response to the reshaped beam, generating an asymmetric spot of light on an area of a color wheel that revolves in a direction of rotation, the spot of light having: a first width aligned tangential to the direction of rotation; and a second width wider than the first width and orthogonal to the first width.

* * * * *